(No Model.)
H. FLATER.
SAW SET.
No. 302,902. Patented Aug. 5, 1884.
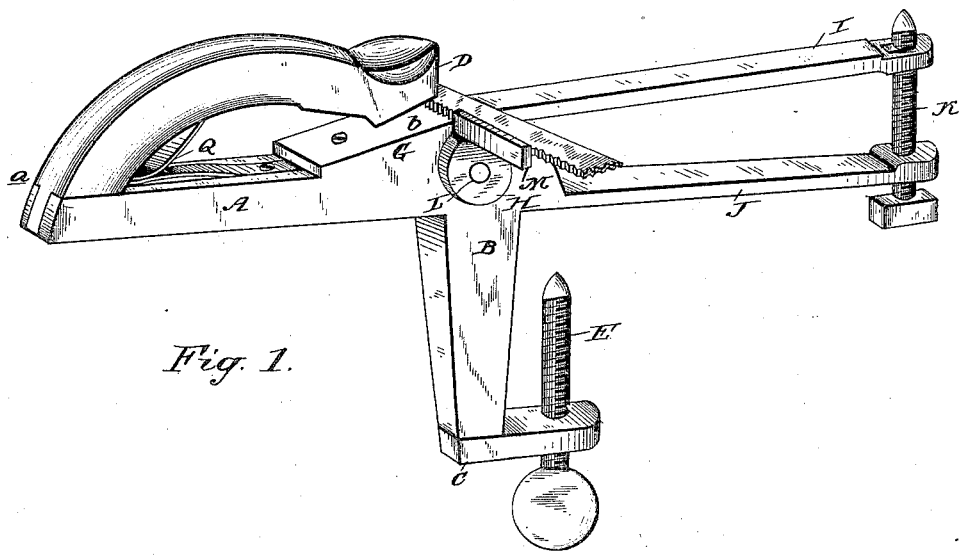
Fig. 1.
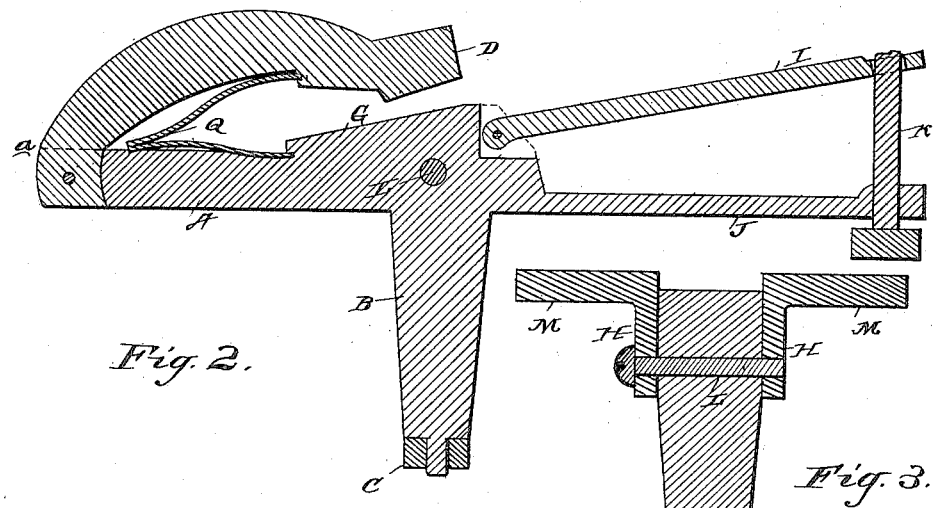
Fig. 2.
Fig. 3.
WITNESSES
C. W. Dashiell
E. G. Siggers
H. Flater,
INVENTOR
by C. A. Snow & Co.
Attorneys

UNITED STATES PATENT OFFICE.

HENRY FLATER, OF FINDLAY, OHIO, ASSIGNOR OF ONE-HALF TO GEORGE R. MARVIN, OF SAME PLACE.

SAW-SET.

SPECIFICATION forming part of Letters Patent No. 302,902, dated August 5, 1884.

Application filed September 20, 1883. (No model.) Patented in Canada January 26, 1884, No. 18,574.

*To all whom it may concern:*

Be it known that I, HENRY FLATER, a citizen of the United States, residing at Findlay, in the county of Hancock and State of Ohio, have invented a new and useful Saw-Set, of which the following is a specification, reference being had therein to the accompanying drawings.

This invention relates to saw-sets; and it has for its object to give a uniform set to any saw, from a fine handsaw to a large crosscut-saw.

With this object in view the said invention consists in certain details of construction and combination of parts, as hereinafter set forth, and particularly pointed out in the claims.

In the accompanying drawings, Figure 1 is a perspective view of my improved saw-set, a portion of the saw in position being shown, and the parts being illustrated in their relative positions for operation. Fig. 2 is a longitudinal section of the same, the saw being omitted. Fig. 3 is a transverse section through the guards.

Like letters refer to corresponding parts in the several figures.

Referring to the drawings, A designates a base-plate provided with a downward extension, B, near the center, a swinging arm, C, being swiveled to the lower end of the extension and provided with a thumb-screw, E, by means of which the machine can be screwed to a bench or fastened in a vise, the swinging arm being adapted to be reversed from one side to the other, so that when setting a crosscut-saw the blade of the saw can be laid on the bench and the set reversed in a very short space of time. The base-plate is preferably made of malleable iron, and may be recessed longitudinally in the middle to receive an anvil, G, of steel, (shown in dotted lines, Fig. 1,) said anvil having a beveled front end, which comes under the head of the pivoted jaw F. Said jaw is pivoted in a recess, *a*, at the front end of the base-plate, a V-shaped spring, Q, having one of its arms secured to the upper face of the said base-plate A, and the other arm bearing against the under side of the pivoted jaw, being adapted to lift the jaw after each blow of the hammer. The head D of the pivoted jaw is also of steel, and is pointed and provided with an under bevel, *b*, to correspond with the beveled upper face of the anvil.

I is an arm pivoted in the base-plate just beyond the anvil, a thumb-screw, K, engaging with the rear end of the arm, and passing through a rearward extension, J, of the base-plate, a sufficient space being left between the arm and the extension to give the thumb-screw enough play to raise and lower the adjusting-level with ease. Since the saw rests upon the pivoted arm I, by operating the thumb-screw K the saw is given the right level, in order that the desired angle may be given to the teeth of said saw.

H designates the guards, preferably made of some soft metal and arranged on each side of the pivoted jaw, an adjusting-screw, L, connecting the guards by passing through the base-plate, and adapted to move the said guards forward or backward, in order to give the proper gage or length of set required. In operation the teeth of the saw rest against the guards at their upper projecting ends, M, and since it is constructed of some soft metal it will not injure the teeth, the guards being adjusted by the means of a screw-driver or other suitable instrument turning the screw L, and thereby causing the turning of the guards in either direction to effect the adjustment of the same to the desired gage of set.

The operation of my invention will be readily understood from the foregoing description, taken in connection with the annexed drawings. The machine is first securely fastened to the bench by the thumb-screw E or placed in a vise, as found desirable. The guards H and the pivoted arm I are then adjusted to the grade of set required, and the saw may now be applied to the saw-set in the manner well known. The points of the saw-teeth are pressed against the guards, and the head of the pivoted jaw is driven down with a hammer or other suitable instrument on each alternate saw-tooth. The alternate teeth, which have not been struck, should be operated upon in a similar manner from the other face of the saw.

The device is simple in its construction, convenient, and effective in operation, inexpensive to manufacture, and will prove of great utility in use to give a uniform set to the teeth of the saw.

Having described my invention, I claim as new—

1. In a saw-set, the combination, with the base-plate having the downward extension B, of a swinging arm swiveled to the lower end of the extension, and a thumb-screw to bind the arm in place, as and for the purpose set forth.

2. In a saw-set, the combination, with the base-plate, of a downward extension, B, swinging arm C, thumb-screw E, a pivoted jaw, F, rearward extension, J, pivoted arm I, thumb-screw K, guards H, and screw L, as and for the purpose set forth.

3. In a saw-set, the combination of the base-plate with the guards H, arranged on opposite sides of the same, and comprising a circular portion having projecting ends M, and a screw, L, connecting the guards and passing through the base-plate, arranged and operating so that the turning of the screw effects the adjustment of the guards, as set forth.

In testimony whereof I affix my signature, in presence of two witnesses, this 14th day of September, 1883.

HENRY FLATER.

In presence of—
ROBERT MORRIS,
JOHN SHERIDAN.